United States Patent
Seito et al.

(10) Patent No.: US 11,084,248 B2
(45) Date of Patent: Aug. 10, 2021

(54) ADHESIVE FOR POLYOLEFIN AND MULTILAYERED STRUCTURE

(71) Applicant: TOYO SEIKAN GROUP HOLDINGS, LTD., Tokyo (JP)

(72) Inventors: Shinya Seito, Yokohama (JP); Takayuki Ishihara, Yokohama (JP); Yosuke Akutsu, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 16/317,955

(22) PCT Filed: Jul. 24, 2017

(86) PCT No.: PCT/JP2017/026614
§ 371 (c)(1),
(2) Date: Jan. 15, 2019

(87) PCT Pub. No.: WO2018/021213
PCT Pub. Date: Feb. 1, 2018

(65) Prior Publication Data
US 2019/0291384 A1     Sep. 26, 2019

(30) Foreign Application Priority Data
Jul. 25, 2016     (JP) .............................. JP2016-145664

(51) Int. Cl.
*B32B 7/12*     (2006.01)
*B32B 27/32*     (2006.01)
(Continued)

(52) U.S. Cl.
CPC ................ *B32B 7/12* (2013.01); *B32B 27/00* (2013.01); *B32B 27/32* (2013.01); *B32B 33/00* (2013.01);
(Continued)

(58) Field of Classification Search
CPC ..... B32B 7/12; B32B 27/32; B32B 2250/242; B32B 2439/60; B32B 2323/04;
(Continued)

(56) References Cited

U.S. PATENT DOCUMENTS

| | | | |
|---|---|---|---|
| 4,460,631 | A | 7/1984 | Stegmeier et al. |
| 6,228,504 | B1 | 5/2001 | Sawada et al. |

(Continued)

FOREIGN PATENT DOCUMENTS

| | | |
|---|---|---|
| CN | 1289291 A | 3/2001 |
| CN | 104999753 A | 10/2015 |

(Continued)

OTHER PUBLICATIONS

International Search Report for PCT/JP2017/026614 dated Oct. 3, 2017 [PCT/ISA/210].

(Continued)

*Primary Examiner* — Jasper Saberi
(74) *Attorney, Agent, or Firm* — Sughrue Mion, PLLC

(57) ABSTRACT

An adhesive for polyolefin used for an extrusion-formed multilayered structure that includes, at least, a propylene type resin layer and an ethylene type resin layer, the adhesive for polyolefin comprising an olefin resin that has methyl branches at a ratio of 10 to 200 per 1000 carbon atoms on a main chain thereof.

2 Claims, 1 Drawing Sheet

(51) Int. Cl.
  *B32B 33/00* (2006.01)
  *C09J 123/26* (2006.01)
  *C09J 123/08* (2006.01)
  *B32B 27/00* (2006.01)
  *B65D 65/40* (2006.01)
  *C09J 123/04* (2006.01)
  *C09J 123/16* (2006.01)

(52) U.S. Cl.
  CPC .............. *B65D 65/40* (2013.01); *C09J 123/04* (2013.01); *C09J 123/08* (2013.01); *C09J 123/26* (2013.01); *B32B 2250/03* (2013.01); *B32B 2250/242* (2013.01); *B32B 2307/7242* (2013.01); *B32B 2323/04* (2013.01); *B32B 2323/10* (2013.01); *B32B 2439/60* (2013.01); *B32B 2439/70* (2013.01); *C09J 123/16* (2013.01)

(58) Field of Classification Search
  CPC ............ B32B 2323/10; B32B 2439/70; B32B 2250/03; C09J 123/04
  See application file for complete search history.

(56) References Cited

U.S. PATENT DOCUMENTS

| | | | | |
|---|---|---|---|---|
| 2003/0027008 | A1* | 2/2003 | Eckstein | B29D 7/01 428/516 |
| 2005/0019596 | A1* | 1/2005 | Marechal | B32B 27/32 428/516 |
| 2015/0041465 | A1* | 2/2015 | Komatsu | B32B 27/32 220/62.11 |

FOREIGN PATENT DOCUMENTS

| | | | |
|---|---|---|---|
| EP | 0 372 875 | A2 | 6/1990 |
| EP | 1 052 090 | A1 | 11/2000 |
| JP | 57-105318 | A | 6/1982 |
| JP | 60-21249 | A | 2/1985 |
| JP | 2-77479 | A | 3/1990 |
| JP | 2-150481 | A | 6/1990 |
| JP | 2005-504669 | A | 2/2005 |
| JP | 2013-241207 | A | 12/2013 |
| JP | 2015-120322 | A | 7/2015 |
| WO | 2013/054616 | A1 | 4/2013 |
| WO | 2016/025663 | A1 | 2/2016 |

OTHER PUBLICATIONS

Communication dated Jan. 28, 2020, from the European Patent Office in European Application No. 17834219.2.
Communication dated Apr. 15, 2020, from The State Intellectual Property Office of the P.R. of China in Application No. 201780046540.5.

* cited by examiner

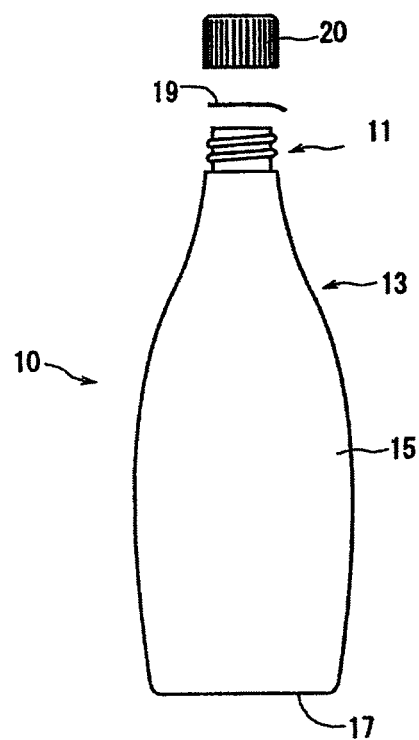

ADHESIVE FOR POLYOLEFIN AND MULTILAYERED STRUCTURE

TECHNICAL FIELD

This invention relates to an adhesive for polyolefin and, more specifically, to an adhesive for polyolefin that excellently adheres to both the polypropylene and the polyethylene.

The invention, further, relates to a multilayered structure provided with adhesive layers comprising the same adhesive.

BACKGROUND ART

Plastic materials have been used in a wide range of applications since they can be easily formed and can be easily shaped into a variety of articles. Specifically, the directly blow-formed containers whose walls have been formed of olefin resins feature flexibility in their walls and are capable of effectively discharging viscous fluid contents. Therefore, these containers have been widely used for containing highly viscous fluids such as ketchup, aqueous paste, honey, a variety of sauces, mayonnaise, mustard, dressing, jam, chocolate syrup, kneaded tooth paste, cosmetic solutions such as lotion, liquid detergent, shampoo, rinse and the like.

As the above-mentioned directly blow-formed container, there has been known the one having a multilayered structure that includes an ethylene type resin layer and a propylene type resin layer (e.g., see a patent document 1).

With the directly blow-formed container having the multilayered structure, the ethylene type resin layer secures flexibility while the propylene type resin layer imparts a suitable degree of rigidity, whereby excellent squeezing capability is expressed making it possible to more effectively discharge the highly viscous fluids. For example, with only the ethylene type resin layer, the body portion of the container can be easily pushed and dented lacking, however, the rigidity. Therefore, the body portion that is dented cannot easily restore its initial shape, i.e., has low squeezing capability. With only the propylene type resin layer, on the other hand, the rigidity is so high that the body portion of the container is little dented when it is pushed, providing low squeezing capability, either. Upon employing the multilayered structure that includes the ethylene type resin layer and the propylene type resin layer, therefore, it is allowed to express a higher degree of squeezing capability.

Here, the above-mentioned multilayered structure needs an adhesive for joining the ethylene type resin layer and the propylene type resin layer together.

As the adhesives for the above use, there have been known those that utilize adhesion based on the chemical bond and those that utilize physical adhesion based on the compatibility. The adhesive that utilizes the adhesion based on the chemical bond can be represented by an acid-modified olefin type resin obtained by modifying, for example, an ethylene type resin or a propylene type resin with a maleic anhydride. This adhesive has been widely used for adhering a gas-barrier layer such as of an ethylene-vinyl alcohol copolymer and an olefin type resin layer together. On the other hand, the adhesive that utilizes the physical adhesion is the one that is obtained by using a resin that is highly compatible with a resin to which it is to be adhered. For example, as the adhesive for the ethylene type resins, there is used a resin that is highly compatible with the ethylene type resins or, concretely, there is used a copolymer of an ethylene and other α-olefin. As the adhesive for the propylene type resins, there is used a resin that is highly compatible with the ethylene type resins or, concretely, there is used a copolymer of a propylene and other α-olefin.

However, the adhesive based on the chemical bond and the adhesive based on the physical bond have differences in their adhesiveness to the propylene type resins and to the ethylene type resins. For instance, if an adhesive exhibits a high degree of adhesiveness to the propylene type resin, then its adhesiveness to the ethylene type resin is not so much high. Likewise, if an adhesive exhibits a high degree of adhesiveness to the ethylene type resin, then its adhesiveness to the propylene type resin is not so much high. This tendency becomes conspicuous particularly in the case of the physical adhesives.

PRIOR ART DOCUMENTS

Patent Documents

Patent document 1: JP-A-2013-241207

OUTLINE OF THE INVENTION

Problems that the Invention is to Solve

It is, therefore, an object of the present invention to provide an adhesive for polyolefin that exhibits excellent adhesiveness to either the propylene type resins or the ethylene type resins.

Another object of the present invention is to provide a multilayered structure that includes a propylene type resin layer and an ethylene type resin layer and, further, includes a layer of the adhesive for polyolefin as the adhesive layer.

Means for Solving the Problems

According to the present invention, there is provided an adhesive for polyolefin used for an extrusion-formed multilayered structure that includes, at least, a propylene type resin layer and an ethylene type resin layer, the adhesive for polyolefin comprising an olefin resin that has methyl branches at a ratio of 10 to 200 per 1000 carbon atoms on a main chain thereof.

In the adhesive for polyolefin of the present invention, further, it is desired that:
(1) The olefin resin has methyl branches at a ratio of 12 to 200 per 1000 carbon atoms on a main chain thereof; and
(2) The olefin resin has been modified with an acid.

According to the present invention, further, there is provided a multilayered structure that includes a propylene type resin layer and an ethylene type resin layer, wherein an intermediate layer comprising the adhesive for polyolefin is provided between the propylene type resin layer and the ethylene type resin layer.

In the multilayered structure, it is desired that:
(3) The intermediate layer comprising the adhesive for polyolefin is provided adjoining the propylene type resin layer and the ethylene type resin layer;
(4) The adhesive for polyolefin has been modified with an acid and, further, includes a gas-barrier layer as an intermediate layer;
(5) The intermediate layer comprising an adhesive for polyolefin is provided between the propylene type resin layer and the gas-barrier layer, and between the ethylene type resin layer and the gas-barrier layer; and, specifically, (6) The multilayered structure is used as a directly blow-formed container.

Effects of the Invention

The adhesive for polyolefin of the present invention comprises an olefin resin having methyl branches that are distributed at a predetermined ratio (10 to 200 branches per 1000 carbon atoms) on a main chain thereof (i.e., on an ethylene chain that is stretching linearly). Owing to the presence of the linear main chain and methyl branches, the adhesive exhibits excellent adhesiveness to the propylene type resin having many methyl branches as well as to the ethylene type resin that is highly linear but has less branches than the propylene type resin.

Therefore, the adhesive for polyolefin of the present invention can be preferably used for adhering the propylene type resin and the ethylene type resin together, can be effectively used as an adhesive layer that is to be provided between the propylene type resin layer and the ethylene type resin layer, and is capable of effectively preventing the peeling between the propylene type resin layer and the ethylene type resin layer.

Specifically, the adhesive modified with an acid such as maleic anhydride adheres favorably even to the gas-barrier resins. In a multilayered structure having a gas-barrier layer as an intermediate layer between the propylene type resin layer and the ethylene type resin layer, in particular, the adhesive modified with the acid can be favorably used as adhesive layer between the gas-barrier layer and the propylene type resin layer, and between the gas-barrier layer and the ethylene type resin layer.

BRIEF DESCRIPTION OF THE DRAWING

FIG. 1 It is a view schematically illustrating a directly blow-formed container which is a representative example of a multilayered structure of the present invention.

MODES FOR CARRYING OUT THE INVENTION

<Adhesive for Polyolefin>

As described already, the adhesive for polyolefin of the present invention comprises an olefin resin which has a molecular structure in which the methyl branches are distributed at a ratio of 10 to 200, preferably, 12 to 200 and, particularly preferably, 10 to 100 per 1000 carbon atoms on the ethylene main chain thereof. Due to this molecular structure, the adhesive adheres excellently to both the propylene type resins and the ethylene type resins.

Here, the excellent adhesiveness exhibited by the adhesive for polyolefin to the propylene type resins and the ethylene type resins, is due to the physical adhesiveness. For instance, presence of the methyl branches accounts for an improved compatibility to the propylene type resin that has a branched structure with many methyl branches (methyl branches easily tangle with the molecular chains of the propylene type resin). Further, the adhesive has methyl branches that are distributed in a limited number and, therefore, has a higher degree of molecular linearity than the propylene type resin. Accordingly, the adhesive exhibits a high compatibility to the ethylene type resin, too, and excellently adheres thereto.

As will be understood from the above description, therefore, if the number of the methyl branches is smaller than the above range, then the adhesive for polyolefin of the present invention exhibits excellent adhesiveness to the ethylene type resin but unsatisfactory adhesiveness to the propylene type resin. If the number of the methyl branches is larger than the above range, on the other hand, the adhesive for polyolefin exhibits excellent adhesiveness to the propylene type resin but unsatisfactory adhesiveness to the ethylene type resin.

Further, the olefin type resin having the methyl branches also has the alkyl branches that are larger than the methyl branches. It is, here, desired that the number of the alkyl branches is suppressed to lie in a range of not more than 50 per 1000 carbon atoms of the main chain. Presence of many alkyl branches that are larger than the methyl branches impairs the molecular linearity and, therefore, causes a decrease in the adhesiveness to the ethylene type resin. This, further, causes a decrease in the compatibility to the propylene type resin despite of the presence of the methyl branches, and impairs the adhesiveness to the propylene type resin.

In the invention, there is no particular limitation on the olefin type resin having the methyl branches so far as the number of the methyl branches is within the above-mentioned range. For instance, the olefin type resin can be a variety of polyethylenes. That is, the polyethylenes can be, usually, divided into high-density polyethylenes, medium-density polyethylenes and low-density polyethylenes, and can be produced by a high-pressure method, a low-pressure method or by using a metallocene catalyst. They range from those having many branches through up to those having less branches and are highly linear. Irrespective of the method of production, it suffices if the polyethylene has the methyl branches in a number that lies within the above-mentioned range. For instance, a highly linear polyethylene may be suitably copolymerized with a small amount of an α-olefin other than the ethylene to so adjust the number of the methyl branches as to lie within the above-mentioned range.

Not being limited to the polyethylene, further, there may be used a polymer of an α-olefin (hexane-1, pentene-1, octene-1, decene-1, etc.) having not less than 6 carbon atoms.

Further, the above olefin type resin may be modified with an acid so far as the number of the methyl branches is within the above-mentioned range. For instance, the olefin type resin may be graft-modified with a maleic acid or a maleic anhydride, and may have carbonyl groups ($>C=O$) introduced into the side chains thereof in an amount of 1 to 100 meq/100 g of the resin and, specifically, 10 to 100 meq/100 g of the resin. The olefin type resin modified with the acid also exhibits adhesiveness due also to the chemical bond. Therefore, the olefin type resin adheres well not only to the propylene type resin and the ethylene type resin but also to the gas-barrier resin as represented by an ethylene-vinyl alcohol copolymer. Specifically, the olefin type resin is very useful as an adhesive layer in a multilayered structure that has a gas-barrier layer as an intermediate layer in addition to having the propylene type resin layer and the ethylene type resin layer.

The olefin type resin having the methyl branches should, further, have a molecular weight or an MFR depending on the use thereof. When used as an adhesive layer in a multilayered structure formed by the extrusion forming, for instance, the olefin type resin should have an MFR of 0.1 to 10 g/10 min. (190° C.). When used as an adhesive layer in a multilayered structure formed by the injection forming, for instance, the olefin type resin should have an MFR of 5 to 80 g/10 min. (190° C.).

<Multilayered Structures>

The adhesive for polyolefin, comprising the above-mentioned olefin type resin having methyl branches, adheres excellently to the propylene type resin and the ethylene type resin, and can be favorably used as an adhesive layer in a multilayered structure that includes the propylene type resin layer and the ethylene type resin layer, as described above repetitively.

For instance, the simplest layer constitution can be expressed by,

PP/AD/PE wherein PP is a propylene type resin layer, PE an ethylene type resin layer, and AD an adhesive layer which comprises an adhesive for polyolefin of the present invention.

As the ethylene type resin in this layer constitution, there can be used a low-density polyethylene, a medium-density polyethylene, a high-density polyethylene, or a random or block copolymer of an ethylene copolymerized with the other α-olefin (propylene, 1-butene, 4-methyl-1-pentene, etc.) in a small amount in a range in which it will not impair the properties of the polyethylene, or a plant-derived resin.

As the propylene type resin, further, there can be used a polypropylene or a random or block copolymer of a propylene copolymerized with the other α-olefin (ethylene 1-butene, 4-methyl-1-pentene, etc.) in a small amount in a range in which it will not impair the properties of the polypropylene.

The ethylene type resin and the propylene type resin are those having MFRs of an extrusion grade or an injection grade depending on the method of forming.

The adhesive for polyolefin of the invention may be a polyethylene though it has a little too many number of the methyl branches. Therefore, the polyethylene, if it has not been modified with an acid, can be used to substitute for the ethylene type resin.

In this case, the above-mentioned three-layered constitution can be substituted by the following two-layered constitution.

PP/PE (AD)

Further, the multilayered structure including the adhesive for polyolefin of the present invention as an adhesive layer, is not limited to the above three-layered constitution only but may be the one that has a gas-barrier layer as an intermediate layer. In this case, therefore, the polyethylene modified with an acid is preferably used as described above.

The gas-barrier layer is formed by using a gas-barrier resin as represented by an ethylene-vinyl alcohol copolymer or an aromatic polyamide (e.g., polymetaxylileneamide). Specifically, the ethylene-vinyl alcohol copolymer is preferably used.

The ethylene-vinyl alcohol copolymer used as the gas-barrier resin is, preferably, a saponified product of a copolymer obtained, usually, by so saponifying an ethylene-vinyl acetate copolymer having an ethylene content of 20 to 60 mol % and, specifically, 25 to 50 mol % that the saponification degree thereof is not less than 96 mol % and, specifically, not less than 99 mol %.

It is also allowable to use the so-called oxygen-absorbing layer as a gas-barrier layer.

As described in JP-A-2002-240813, the oxygen-absorbing layer contains an oxidizable polymer and a transition metal catalyst. The oxidizable polymer is oxidized with oxygen by the action of the transition metal catalyst, and absorbs oxygen to interrupt the transmission of oxygen. The oxidizable polymer and the transition metal catalyst have been closely described in the above JP-A-2002-240813, and are not described here in detail. Here, however, representative examples of the oxidizable polymer include olefin resins having tertiary carbon atoms (e.g., polypropylene, polybutene-1, and copolymers thereof), thermoplastic polyesters and aliphatic polyamides; xylylene group-containing polyamide resins; and ethylenically unsaturated group-containing polymers (e.g., polymers derived from polyenes such as butadiene, etc.). As the transition metal catalyst, there can be exemplified inorganic salts, organic salts and complexes of transition metals such as iron, cobalt, nickel, etc.

Described below are examples of the layer constitutions of the multilayered structure having the above-mentioned gas-barrier layer though not limited thereto only. Here, the gas-barrier layer is represented by GB.

PP/AD/GB/AD/PE

PP/AD/GB/AD/PP/AD/GB/AD/PE

PE/AD/GB/AD/PP/AD/GB/AD/PE

It is also allowable to include, as an intermediate layer, a reground resin layer formed by using a blend of a virgin resin of ethylene resin or propylene resin with the scrap such as burrs that generate at the time of forming the above-mentioned multilayered structure.

As required, the layer of a polyester such as polyethylene terephthalate can be provided together with the PP layer and the PE layer. In this case, too, the acid-modified adhesive for polyolefin of the invention can be used for adhering the polyester layers.

In the above-mentioned various kinds of multilayered structures, each layer has a thickness that meets the properties required for the multilayered structure. The thickness is, usually, about 0.5 to about 20 μm in the case of the adhesive layer (AD) using the adhesive for polyolefin of the present invention.

In the multilayered structure of the invention, further, the same adhesive can be used for forming the adhesive layer that adjoins the propylene type resin layer (PP) and for forming the adhesive layer that adjoins the ethylene type resin layer (PE), offering a great advantage from the standpoint of decreasing the cost.

<Forms of the Multilayered Structure>

The multilayered structure of the present invention can assume a variety of forms, and can be, particularly preferably, used in the form of packing materials such as packing container, lid material, cap and the like. Being imparted with the flexibility due to the ethylene type resin layer and the rigidity due to the propylene type resin layer, the multilayered structure exhibits excellent squeezing capability and can, therefore, be most preferably used in the form of a so-called directly blow-formed container.

The directly blow-formed container assumes the form of, for example, a bottle shown in FIG. 1.

In FIG. 1, the container generally designated at 10 includes a neck portion 11 having a screw thread, a body wall 15 continuous to the neck portion 11 via a shoulder portion 13, and a bottom wall 17 that is closing the lower end of the body wall 15. After the container has been filled with the content, the mouth portion formed in the form of neck portion 11 is sealed with an aluminum foil 19, and is fitted with a cap 20. The container is then ready to be placed in the market.

To produce the directly blow-formed container of this type, a parison of the form of a pipe is, first, formed by the co-extrusion so as to assume the above-mentioned layer structure. As the parison is formed, an end of the parison that is formed is pinched off and is closed. Next, a fluid is blown into the interior of the parison to shape it into a bottle.

The thus directly blow-formed container has the above-mentioned multilayered structure. In the multilayered constitution thus formed, it is desired that the ethylene resin type layer (PE) is present on the inner surface side. That is, the ethylene resin type layer is highly flexible and easily deforms. By forming the ethylene resin type layer on the inner surface of the container, therefore, the content can be quickly discharged when the container is deformed or squeezed.

After the above directly blow-formed container has been formed, it is desired to spray, onto the inner surface of the container, a liquid that works to improve the slipping property to the content, such as silicone oil, fatty acid triglyceride or various vegetable oils, or to form a resin containing these liquids as the innermost layer of the container so as to form a liquid film thereon relying on the bleeding phenomenon. Concretely, it is desired to use a liquid having a surface tension in a range of 10 to 40 mN/m and, specifically, 16 to 35 mN/m. Its representative examples include fluorine type liquid, fluorine type surfactant, silicone oil, fatty acid triglyceride and various vegetable oils. As the vegetable oils, there can be desirably used soy oil, rape oil, olive oil, rice oil, corn oil, safflower oil, sesame oil, palm oil, castor oil, avocado oil, coconut oil, almond oil, walnut oil, hazelnut oil and salad oil. This makes it possible to greatly improve easiness for discharging viscous contents that contain water.

The liquid film is, usually, formed by using the liquid in an amount of about 0.2 to about 50 g/m$^2$, and makes it possible to greatly improve the easiness for discharging viscous contents such as ketchup, aqueous paste, honey, various sauces, mayonnaise, mustard, dressing, jam, chocolate syrup, cosmetic solution such as lotion, liquid detergent, shampoo, rinse and the like.

Further, the surface of the multilayered structure of the present invention may be rendered to be finely rugged. A surface-roughening agent may be added to the resin of the layers of the container or of the outermost layer, or may be externally added thereto. The surface-roughening agent, usually, comprises fine particles having an average particle diameter of not more than 40 μm and, specifically, 0.2 to 20 μm. For example, though there is no specific limitation so far as the average particle diameter lies within the above-mentioned range, there can be, generally, used metal oxide particles such as of titanium oxide, alumina or silica, carbonaceous fine particles such as of carbonate like calcium carbonate or sodium carbonate, or carbon black, and organic fine particles comprising polymethyl(meth)acrylate, polyethylene, or silicone particles as represented by polyorganosilsesquioxane. These fine particles may be treated with a silane coupling agent or a silicone oil so as to be hydrophobic. The present invention can be put into practice even by the extrusion forming as represented by the direct blow-forming and, therefore, what is required is that the particle diameters are maintained even after the melt-forming. Therefore, there can be preferably used fine particles that have been treated to be hydrophobic and, specifically, hydrophobic silica, cured product of polymethyl methacrylate, ultra-high molecular polyethylene, polyorganosilsesquioxane and silicone particles. The fine particles may be used for the above-mentioned directly blow-formed container in order to further improve the easiness for discharging.

The average particle diameter of the fine particles varies depending on the kind and sizes of the fine particles, and can, generally, be measured by the observation using an electron microscope such as transmission type electron microscope or scanning type electron microscope, or by the laser diffraction light scattering method. The average particle diameter of the fine particles is defined as an average diameter of the particles when measured by the observation by using the electron microscope, or is defined as the particle diameter at an integrated value 50% calculated as a volume in the particle size distribution when measured by the laser diffraction light scattering method. In the case of the fine particles having a primary particle diameter of not more than 0.2 μm such as of silica, it is very difficult for the particles to stay in the form of primary particles alone. In this case, therefore, the average particle diameter is defined to be that of the secondary particles.

The fine particles used as the surface-roughening agent is, usually, added in an amount of 0.1 to 30 parts by weight, preferably, 0.3 to 20 parts by weight and, more preferably, 0.3 to 10 parts by weight per 100 parts by weight of the resin. Use of the fine particles in amounts outside the above-mentioned range makes it difficult to form the rough surface that helps favorably form liquid protuberances.

In the above-mentioned multilayered structure, the propylene type resin layer and the ethylene type resin layer favorably adhered together, and are effectively prevented from peeling.

EXAMPLES

The invention will now be explained by the following Experimental Examples.

Described below are various properties, methods of measuring the properties, and resins used for forming the multilayered structures (bottles) in the following Examples.

1. Measuring the Bottle Constitution

By using a polarizing microscope, a multilayered bottle formed by a method that will be described later was observed for its layer constitution on a horizontal cross section of the body portion at a position 50 mm above the bottom thereof to find the layer constitution of the body portion of the bottle. The layer constitution was observed at positions of 0°, 90°, 180° and 270° relative to the cross section, and an average value in the four directions was regarded to be the layer constitution of the bottle.

2. Analysis of the Structure of the Resin for Forming the Adhesive Layer 0.6 Milliliters of a mixed solvent of benzene/orthodichlorobenzene=⅓ deuterium body was added to 0.06 g of a resin for forming the adhesive layer, and was measured by the $^{13}$C-NMR (EX-270: Nihon Denshi Co.) (temperature: 120° C., number of times of integration: 10,000 times). From the obtained spectra were found the kind of the side chains and the number of the branches thereof included in the skeleton of the main chain of the resin for forming the adhesive layer. The number of the branches was per 1000 carbon atoms in the skeleton of the main chain.

3. Evaluating the Adhesiveness

The mouth portion of a multilayered bottle formed by a method described later was cut by using a reamer to observe the cross section thereof. The cross section was scratched with tweezers and was rated to be × when the layers were peeled in the interface of the layers and ◯ when no layer was peeled. When peeled, it was confirmed which layer was peeled by using an optical microscope (LSM5 Pascal: Carl Zeiss).

Example 1

There were provided the following resins and liquids for forming the layers and for forming the liquid film on the inner surface.

Resins for Forming the Inner Layer;
  High pressure low-density polyethylene (LDPE)
    MFR: 0.3 g/10 min (190° C., 2.16 kg)
    Density: 0.922 g/cm$^3$
  Cyclic olefin resin (COC);
    Ethylene-tetracyclododecene copolymer
    MFR: 30 g/10 min (260° C., 2.16 kg)
    Density: 1.02 g/cm$^3$
    Tg: 80° C.
  Gas phase linear low-density polyethylene (LLDPE)
    MFR: 7.0 g/10 min (190° C., 2.16 kg)
    Density: 0.922 g/cm$^3$
Resin for Forming the Outer Layer and Main Layer;
  Ethylene-propylene random copolymer resin (PP)
    MFR: 1.3 to 1.9 g/10 min
    Density: 0.90 g/cm$^3$
Resin for Forming the Adhesive Layer;
  Maleic anhydride-modified polyethylene A (resin A)
    Described below is the structure of the branched chains of the resin A measured by the above-mentioned method.
    Methyl group: 20.3
    Ethyl group: 0
    Butyl group: 4.5
    Pentyl group: 2.0
Resin for Forming the Gas-Barrier Layer;
  Ethylene-vinyl alcohol copolymer (EVOH)
    Density: 1.19 g/cm$^3$
    Tg: 69° C.
Liquid for Forming the Liquid Film;
  Medium-chain fatty acid triglyceride (MCT)
    Surface tension (23° C.): 28.8 mN/m,
    Viscosity (23° C.): 33.8 mPa·s
    Boiling point: 210° C. or higher
    Inflammation point: 242° C. (reference value)

The surface tension of the liquid was measured at 23° C. by using a solid-liquid interface analyzing system DropMaster 700 (manufactured by Kyowa Interface Science Co., Ltd.). The density of the liquid necessary for measuring the surface tension of the liquid was measured at 23° C. by using a density hydrometer DA-130 (manufactured by Kyoto Electronics Manufacturing Co., Ltd.). Further, the viscosity of the lubricating solution was measured at 23° C. by using a tuning fork oscillation type viscometer SV-10 (manufactured by A & D Co.).

Pellets of a resin composition (for forming the inner layer) comprising a high pressure low-density polyethylene (LDPE, MFR=0.3), a cyclic olefin type resin (COC), a gas phase linear low-density polyethylene (LLDPE) and a medium-chain fatty acid triglyceride (MCT) at a ratio of 10/3/1/1 (parts by weight), were fed into a 30-mm extruder A, pellets of a resin for forming the outermost layer were fed into a 40-mm extruder, pellets of a resin for forming the main layer were fed into a 50-mm extruder, pellets of a resin for forming the adhesive layer were fed to a 30-mm extruder B, and pellets of a resin for forming the gas-barrier layer were fed to a 30-mm extruder C. A molten parison was extruded through a multilayered die head heated at 210° C., and from which a five-kind-nine-layer multilayered bottle having a capacity of 150 g and weighing 15 g was produced by using a mold maintained at 20° C. relying on the known directly blow-forming method.

The thus produced bottle was measured for its constitution and evaluated for its adhesiveness as described above. The results were as shown in Tables 1 and 2.

Example 2

A multilayered bottle was formed in the same manner as in Example 1 but using the high pressure low-density polyethylene (LDPE) only as the resin for forming the inner layer.

The thus produced bottle was measured for its constitution and evaluated for its adhesiveness as described above. The results were as shown in Tables 1 and 2.

Example 3

A maleic anhydride-modified polyethylene B (resin B) was provided as the resin for forming the adhesive layer.
Described below was the structure of the branched chains of the resin B measured by the above-mentioned method.
  Methyl group: 11.1
  Ethyl group: 0
  Butyl group: 4.1
  Pentyl group: 2

A multilayered bottle was formed in the same manner as in Example 1 but using the above-mentioned as the resin for forming the adhesive layer.

The thus produced bottle was measured for its constitution and evaluated for its adhesiveness as described above. The results were as shown in Tables 1 and 2.

Comparative Example 1

A maleic anhydride-modified polyethylene C (resin C) was provided as the resin for forming the adhesive layer.
Described below was the structure of the branched chains of the resin C measured by the above-mentioned method.
  Methyl group: 0
  Ethyl group: 0
  Butyl group: 0.1
  Pentyl group: 1.5

A multilayered bottle was formed in the same manner as in Example 1 but using the above-mentioned as the resin for forming the adhesive layer.

The thus produced bottle was measured for its constitution and evaluated for its adhesiveness as described above. The results were as shown in Tables 1 and 2.

Comparative Example 2

A maleic anhydride-modified polyethylene D (resin D) was provided as the resin for forming the adhesive layer.
Described below was the structure of the branched chains of the resin D measured by the above-mentioned method.
  Methyl group: 216.5
  Ethyl group: 5.2
  Butyl group: 8.9
  Pentyl group: 0

A multilayered bottle was formed in the same manner as in Example 1 but using the above-mentioned as the resin for forming the adhesive layer.

The thus produced bottle was measured for its constitution and evaluated for its adhesiveness as described above. The results were as shown in Tables 1 and 2.

The bottles formed in Examples 1, 2 and Comparative Examples 1, 2 and 3 all possessed the following layer constitution in their body portions.
  Outer layer: 150 μm
  Adhesive layer: 10 μm
  Gas-barrier layer: 20 μm
  Adhesive layer: 10 μm
  Main layer: 450 μm
  Adhesive layer: 10 μm
  Gas-barrier layer: 20 μm
  Adhesive layer: 10 μm
  Inner layer: 80 μm

TABLE 1

Constitution of the bottle

| | | | Adhesive layer a | | | |
| | | | Number of the branched chains of the adhesive (per 1000 carbon atoms) | | | |
| | Outer layer | Kind | Methyl group | Ethyl group | Butyl group | Pentyl group |
|---|---|---|---|---|---|---|
| Example 1 | PP | resin A | 20.3 | 0 | 4.5 | 2 |
| Example 2 | ↑ | ↑ | ↑ | ↑ | ↑ | ↑ |
| Example 3 | ↑ | resin B | 11.1 | 0 | 4.1 | 2 |
| Comparative Example 1 | ↑ | resin C | 0 | 0 | 0.1 | 1.5 |
| Comparative Example 2 | ↑ | resin D | 216.5 | 5.2 | 8.9 | 0 |

Constitution of the bottle

| | Barrier layer A | Adhesive layer b | Main layer | Adhesive layer c | Barrier layer B | Adhesive layer d | Inner layer |
|---|---|---|---|---|---|---|---|
| Example 1 | EVOH | resin A | PP | resin A | EVOH | resin A | LDPE/COC/LLDPE/MCT |
| Example 2 | ↑ | ↑ | ↑ | ↑ | ↑ | ↑ | LDPE |
| Example 3 | ↑ | resin B | ↑ | resin B | ↑ | resin B | LDPE/COC/LLDPE/MCT |
| Comparative Example 1 | ↑ | resin C | ↑ | resin C | ↑ | resin C | ↑ |
| Comparative Example 2 | ↑ | resin D | ↑ | resin D | ↑ | resin D | ↑ |

*The adhesive layers a, b, c and d are the same layers.
*The barrier layers A and B are the same layers.

TABLE 2

| | Evaluation | |
| | Adhesiveness | Interfacial peeling |
|---|---|---|
| Example 1 | ○ | no |
| Example 2 | ○ | no |
| Example 3 | ○ | no |
| Comparative Example 1 | X | outer layer/adhesive layer a, adhesive layer b/main layer, main layer/adhesive layer c |
| Comparative Example 2 | X | adhesive layer d/inner layer |

In Examples 1, 2 and 3 using adhesives having not less than 10 methyl group branches per 1000 carbon atoms, the adhesive layers remained strongly adhered to the adjoining PP layers or to both the LDPE layers without being peeled. Even by comparing Example 1 with Example 2, favorable adhesiveness was realized as well despite an additive was used but if the LDPE layers adjoining the adhesive layers were chiefly comprised of the LDPE. In Comparative Example 1 in which the number of the methyl group branches was not more than 10 per 1000 carbon atoms, however, the adhesive layers remained adhered to the adjoining LDPE layers but peeled off the PP layers. In Comparative Example 2 in which the number of the methyl group branches was not less than 200 per 1000 carbon atoms, on the other hand, the adhesive layers remained adhered to the adjoining PP layers but peeled off the LDPE layers.

It will, therefore, be learned that by using an adhesive having the methyl group branches in a number of 10 to 200 per 1000 carbon atoms, it becomes possible to adhere together the PP and the LDPE which are the different kinds of materials.

DESCRIPTION OF REFERENCE NUMERALS

10: bottle
11: neck portion
13: shoulder portion
15: body wall
17: bottom wall

The invention claimed is:

1. A multilayered structure that includes a propylene resin layer and an ethylene resin layer, wherein an adhesive intermediate layer consisting of a polyolefin is provided between and adjoins said propylene resin layer and said ethylene resin layer, and said polyolefin is an acid-modified olefin resin that has methyl branches at a ratio of greater than 20 and less than or equal to 200 per 1000 carbon atoms on a main chain thereof and the number of alkyl branches larger than the methyl groups is not more than 50 per 1000 carbon atoms on the main chain thereof.

2. The multilayered structure according to claim 1, wherein the multilayered structure is a directly blow-formed container.

* * * * *